(12) United States Patent
Tanaka et al.

(10) Patent No.: US 6,390,318 B1
(45) Date of Patent: May 21, 2002

(54) SEALED CONTAINER

(75) Inventors: Akihito Tanaka, Toyohashi; Shinichi Oda, Okazaki; Izumi Kitazawa, Hamana-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/615,127

(22) Filed: Jul. 13, 2000

(30) Foreign Application Priority Data

Jul. 14, 1999 (JP) .......................................... 11-200894

(51) Int. Cl.[7] ............................................... B65D 51/16
(52) U.S. Cl. ............................ 220/203.26; 220/203.28; 220/303; 220/DIG. 32; 165/104.32
(58) Field of Search ....................... 220/203.02, 203.26, 220/203.28, 303, 304, DIG. 32, 203.06; 165/104.32

(56) References Cited

U.S. PATENT DOCUMENTS

| | | | | |
|---|---|---|---|---|
| 4,185,751 A | * | 1/1980 | Moore et al. | 220/DIG. 32 |
| 5,052,571 A | * | 10/1991 | Susa et al. | 220/DIG. 32 |
| 5,114,035 A | * | 5/1992 | Brown | 220/DIG. 32 |
| 5,163,506 A | | 11/1992 | Attinger | |
| 5,357,909 A | * | 10/1994 | Attinger et al. | 165/104.32 |
| 5,522,456 A | * | 6/1996 | Valk | 165/104.32 |
| 5,603,425 A | * | 2/1997 | Breeden | 220/DIG. 32 |
| 6,056,139 A | * | 5/2000 | Gericke | 220/DIG. 32 |

FOREIGN PATENT DOCUMENTS

GB         2033351         *   5/1980

* cited by examiner

*Primary Examiner*—Nathan J. Newhouse
(74) *Attorney, Agent, or Firm*—Harness, Dickey & Pierce, PLC

(57) ABSTRACT

The present invention provides a seal portion mounted on an inner wall of a cap. When the cap is removed from the main body of the container, the seal is positioned below a position where a first screw thread is screwed to a second screw thread. The first screw thread is formed on inside or outside of an outer cylindrical wall of the main body of the container. Whereas, the second screw portion is formed on the outer circumference or the inner circumference of the outer wall portion of the cap.

14 Claims, 8 Drawing Sheets

SEALED CONTAINER

CROSS-REFERENCE TO RELATED APPLICATION

The present invention is related to Japanese patent application No. Hei. 11-200894, filed Jul. 14, 1999; the contents of which are incorporated herein by reference.

FIELD OF THE INVENTION

The present invention relates to a residual pressure elimination structure of a sealed container, and more particularly, to a residual pressure elimination structure of a sealed container which allows the inside to be completely closed from the outside and returns only cooling water to an engine cooling water system.

BACKGROUND OF THE INVENTION

Conventionally, as shown in FIG. 12, a sealed reserve tank 100 for returning only cooling water to an engine cooling water system, separates air inside the engine cooling water system from the cooling water. The tank is connected, in a fluid-tight manner, to a radiator through a connection pipe (not shown). In addition, the sealed reserve tank 100 is also connected in a fluid-tight manner between a water pump 97 of a water-cooling-type engine 96 and a thermostat 98 by a connection pipe 99.

As shown in FIG. 13, there is a first conventional sealed reserve tank 100 which comprises a resin tank main body 101 shaped as a container and having a resin screw cap 102 screwed over an injection port 103 of the resin tank main body 101. The resin tank main body 101 has an inner cylindrical wall 104 surrounding the injection port 103 and an outer circumferential screw portion 105 formed on the outer circumference of the inner cylindrical wall 104. The inner cylindrical wall 104 is also referred to as a neck filler or a seal portion.

On the other hand, the resin screw cap 102 has a valve case 106, a handle 107 having a cylindrical shape, an inner circumferential screw portion 108 and a disc-like gasket 110. In the valve case 106, a pressure control valve and a negative pressure valve are disposed. The cylindrical handle 107 is provided on the outer side of the valve case 106. The inner-circumferential screw portion 108 is formed on the inner side of the cylindrical handle 107 and screwed up or down using the outer-circumferential screw portion 105. The gasket 110 is attached to a lower-end surface of a flanged portion 109 of the valve case 106.

Another typical sealed tank, illustrated in FIG. 14, includes a second conventional sealed tank 200 which comprises a resin tank main body 201 shaped as a container and having a resin screw cap 202 screwed over an injection port 203 of the resin tank main body 201. The resin tank main body 201 has an inner cylindrical wall 204 surrounding the injection port 203, an outer cylindrical wall 206 separated from the inner cylindrical wall 204 (seal portion) in a radial direction by cylindrical gap 205, an inner circumferential screw portion 207 formed on the inner circumference of the outer cylindrical wall 206 and an overflow path 208 for discharging cooling water from the lower end of the wall 206 to the outside.

Resin screw cap 202 has a valve case 209, an outer wall portion 210, an outer circumferential screw portion 211 and a disc-like gasket 213. In the valve case 209, a pressure control valve and a negative pressure valve are disposed. The outer wall portion 210 is provided on the outer side of the valve case 209. The outer circumferential screw portion 211 is formed on the outer side of the outer wall portion 210 and screwed with the inner circumferential screw portion 207. The disc-like gasket 213 is attached to an annular mounting groove 212 formed on the outer circumference of the valve case 209.

In the first conventional sealed reserve tank 100, shown in FIG. 12, when the resin screw cap 102 is loosened to replace cooling water, the cooling water leaks through a seal portion between the inner cylindrical wall 104 of the resin tank main body 101 and the gasket 110 as shown in FIG. 13. This leakage occurs from the engine cooling water system wherein the cooling water is at a high temperature and at a high pressure. The leaking cooling water then flows to a shoulder portion 111 of the resin tank main body 101 through a gap between the outer-circumferential screw portion 105 and the inner-circumferential screw portion 108.

Thus, when the resin screw cap 102 is removed from the resin tank main body 101, the cooling water is dispersed over portions surrounding the resin screw cap 102 or over the upper surface of the shoulder portion 111 of the resin tank main body 101. It is therefore possible that the high-temperature cooling water splashes on the service person, jeprodizing safety. In addition, since the cooling water is randomly dispersed around resin screw cap 102, the surface of the resin tank main body 101 becomes dirty, thereby reducing appearance. Therefore, the user, who sees the dirt on the surface of the resin tank main body 101, assumes that cooling water has leaked from the sealed reserve tank 100 due to some damage, leading the user to believe the reliability of cooling-water replacement or product is poor.

In the reserve tank 200, when the resin screw cap 202 is loosened to replace cooling water, the cooling water leaks through a seal portion between the inner cylindrical wall 204 of the resin tank main body 201 and the gasket 213 as shown in FIG. 14. Again, this leakage is from the engine cooling water system wherein the cooling water is at a high temperature and high pressure. Since leaking cooling water then flows out through an overflow path 208 in a specific direction, the appearance of the second conventional sealed reserve tank 200 is good in comparison with the first conventional sealed reserve tank 100.

However, the position at which the gasket 213 is removed from the inner cylindrical wall 204 is higher than the lower-end position of the outer circumferential screw portion 211 of the resin screw cap 202. As shown in the figure, the removal position of the gasket 213 from the inner cylindrical wall 204 is higher than the lower-end position of the outer circumferential screw portion 211 of the resin screw cap 202. Thus, when a large amount of high-temperature and high-pressure cooling water overflows from the engine cooling water system, the cooling water flows through a gap between the outer circumferential screw portion 211 and the inner circumferential screw portion 207 of the resin tank main body 201, leaking from the portions surrounding the resin screw cap 202 to the upper surface of the resin tank main body 201. The present invention was developed in light of these and other drawbacks.

SUMMARY OF THE INVENTION

To address the aforementioned drawbacks, the present invention provides a seal portion mounted on an inner wall of a cap. When the cap is removed from the main body of the container, the seal is positioned below a position where a first screw thread is screwed to a second screw thread. The first screw thread is formed on inside or outside of an outer cylindrical wall of the main body of the container. Whereas, the second screw portion is formed on the outer circumference or the inner circumference of the outer wall portion of the cap.

In this configuration, when the cap is removed from the main body of the container during high fluid temperature and pressures, fluid leaking out from the gap between the seal portion and the inner cylindrical wall or the inner wall does not leak out from a gap between the first screw portion of the main body of the container and the second screw portion of the cap. Instead, it is discharged in a specific direction toward the outside of the main body of the container from a position lower than the first screw portion through an overflow path. Since dirt on the surface of the main body of the container can be avoided without putting the safety of the service person at stake due to dispersing high-temperature fluid over portions surrounding the cap, the safety of the service person, the appearance of the container and the reliability of the service work can be maintained in a good state.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
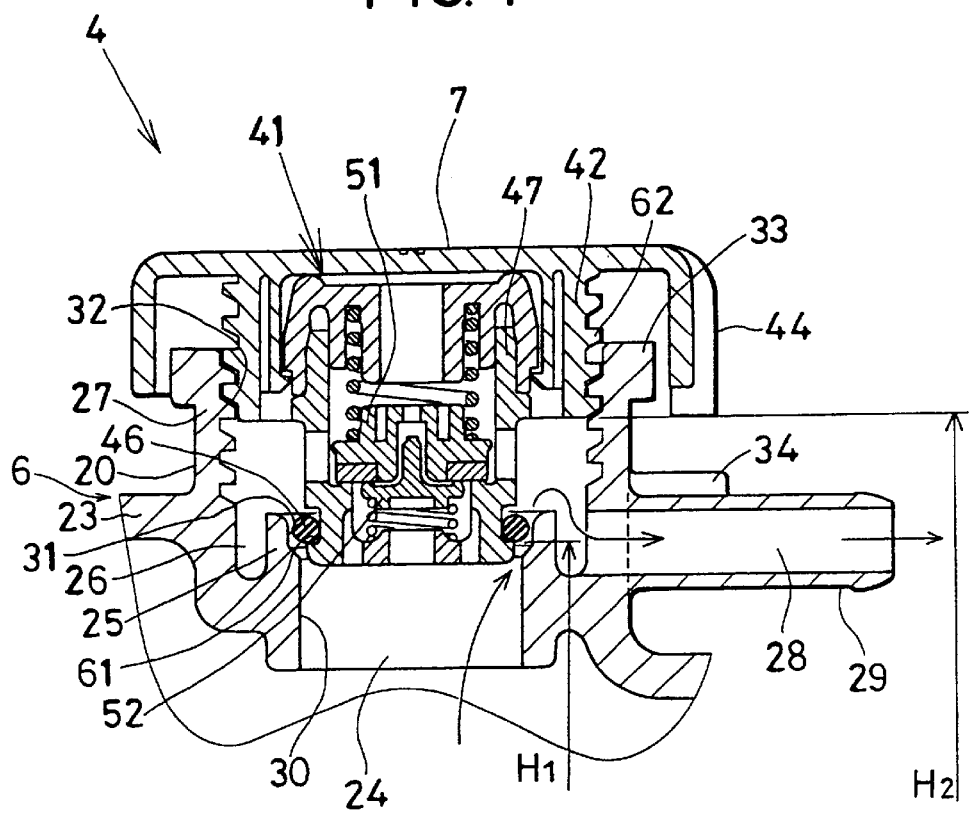
FIG. 1 is a cross-sectional view of a residual pressure elimination structure for a sealed reserve tank according to the present invention.
Figure 2:
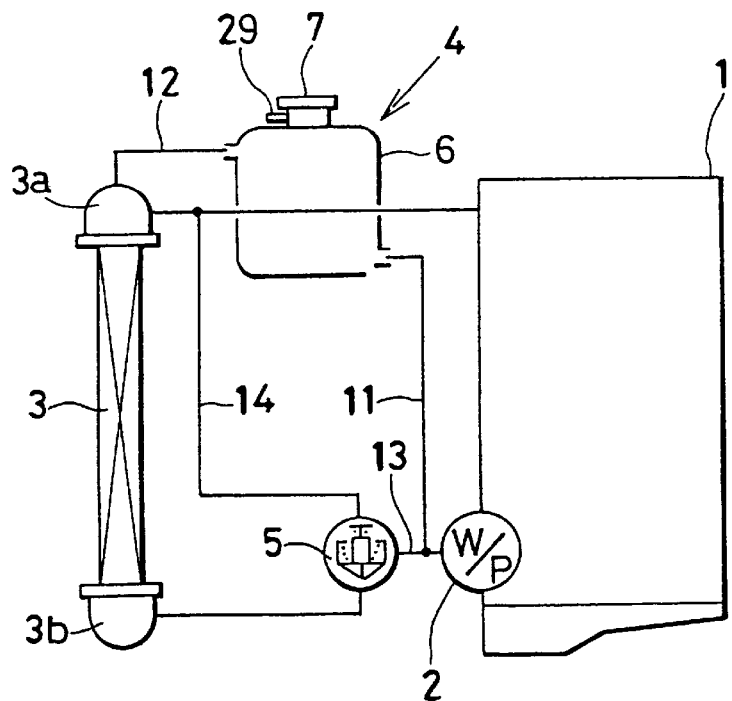
FIG. 2 is a diagrammatic view showing a cooling system for cooling an engine for a sealed reserve tank according to the present invention.

FIGS. 1 to 6 are diagrams showing a first embodiment of the present invention. Here, in this embodiment, a vehicle is provided with an engine cooling apparatus for cooling a water-cooled engine 1 of the vehicle to a proper temperature. In the vehicle-engine cooling apparatus, components such as a radiator 3 are connected in a ring-like manner to the engine 1 and a water pump 2 (see FIG. 2). It should be noted that a sealed reserve tank 4 is connected to an upper tank 3a of the radiator 3. A thermostat 5 is connected, in a liquid-tight manner, to a lower tank 3b of the radiator 3 by a connection pipe.

A system pressure of the engine cooling apparatus is set at a predetermined value of typically 108 kPa by a resin screw cap (a pressure-type cap) 7 which is attached to the upper portion of a tank body 6 of the sealed reserve tank 4. Reference numeral 11 denotes a connection pipe communicating the sealed reserve tank 4 with the inlet of a water pump 2. The connection pipe 11 serves as a pressure applying circuit for applying a uniform system pressure to all components of the engine 1 by the existence of the resin screw cap 7.

Reference numeral 12 denotes a connection pipe communicating the upper tank 3a of the radiator 3 with the sealed reserve tank 4. The connection pipe 12 serves as an air bleeding circuit for bleeding air. Reference numeral 13 denotes a suction pipe connecting the thermostat 5 to the inlet of the water pump 2. Reference numeral 14 denotes a bypass pipe for the cooling water of the engine 1 from the radiator 3 when the cooling water reaches a low temperature not more than a predetermined value.

Figure 3:
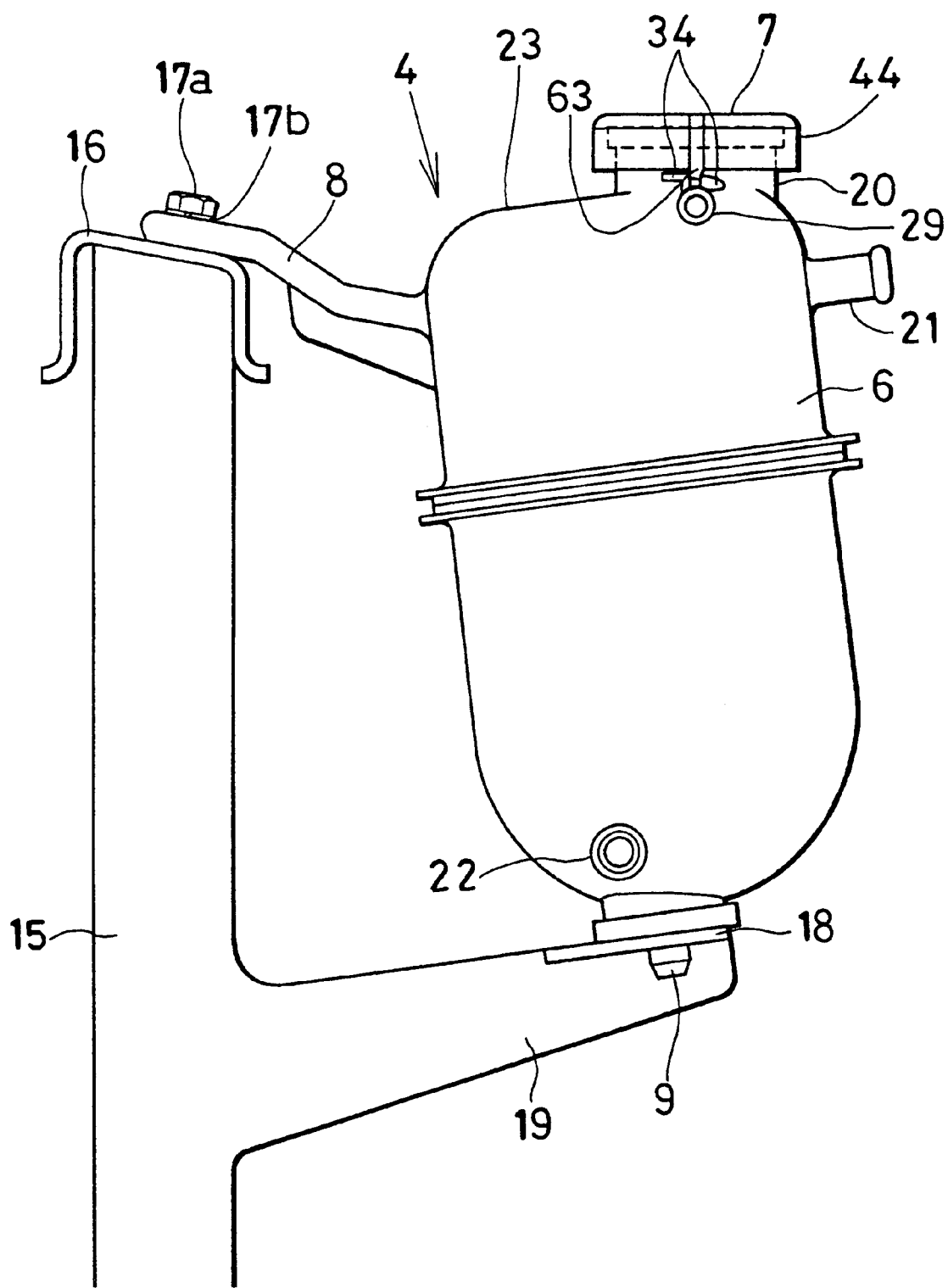
FIG. 3 is a diagrammatic view showing an installation device for a sealed reserve tank according to the present invention.

Next, with reference to FIG. 3, installation of the sealed reserve tank 4 implemented by this embodiment on the body of the vehicle is explained. A metal fitting 16 is provided on the upper end of a mounting wall 15 fixed on the body of the vehicle. The metal fitting 16 is used for attaching the sealed reserve tank 4 through a bracket 8. The end of the bracket 8 is firmly fixed on the metal fitting 16 by using a fixing bolt 17a and a washer 17b.

A mounting stay portion 19 protrudes from a side surface of the mounting wall 15. The mounting stay portion 19 has a seat 18 on which the sealed reserve tank 4 is attached. A fixing hole, not shown, in the figure is formed on the seat 18. A cylindrical pin 9 protruding out from the bottom of the sealed reserve tank 4 engages the hole on the seat 18. The cylindrical pin 9 serves as a position-shift prevention means.

Figure 4:
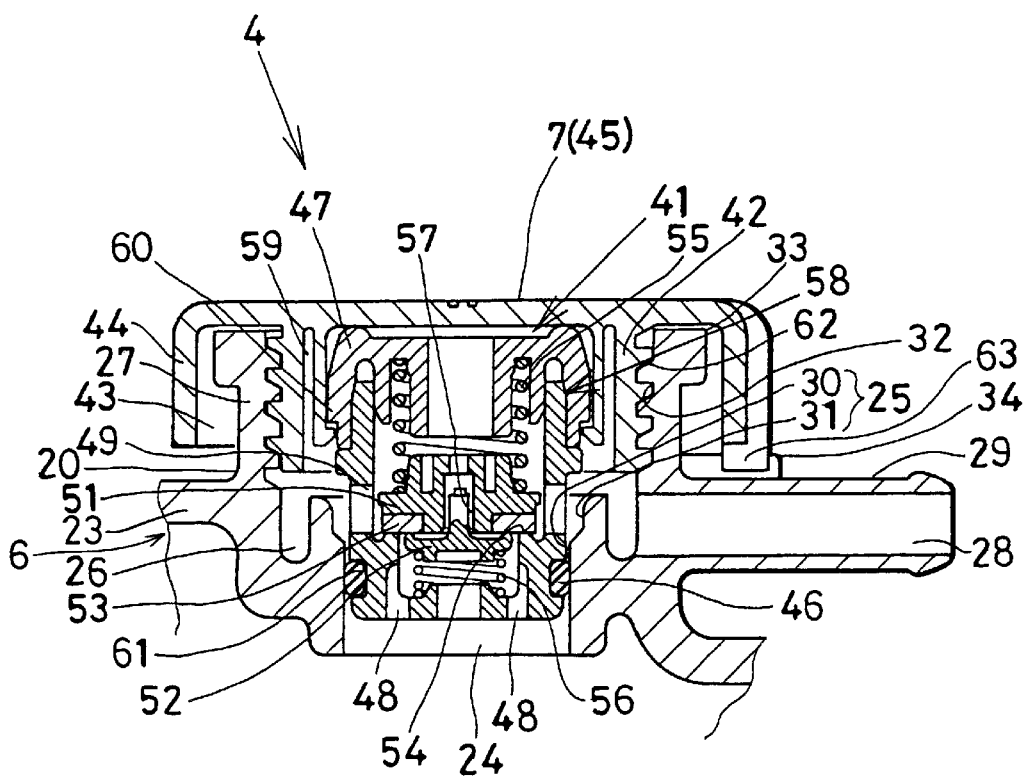
FIG. 4 is a cross-sectional view of a valve for a sealed reserve tank according to the present invention.
Figure 5:
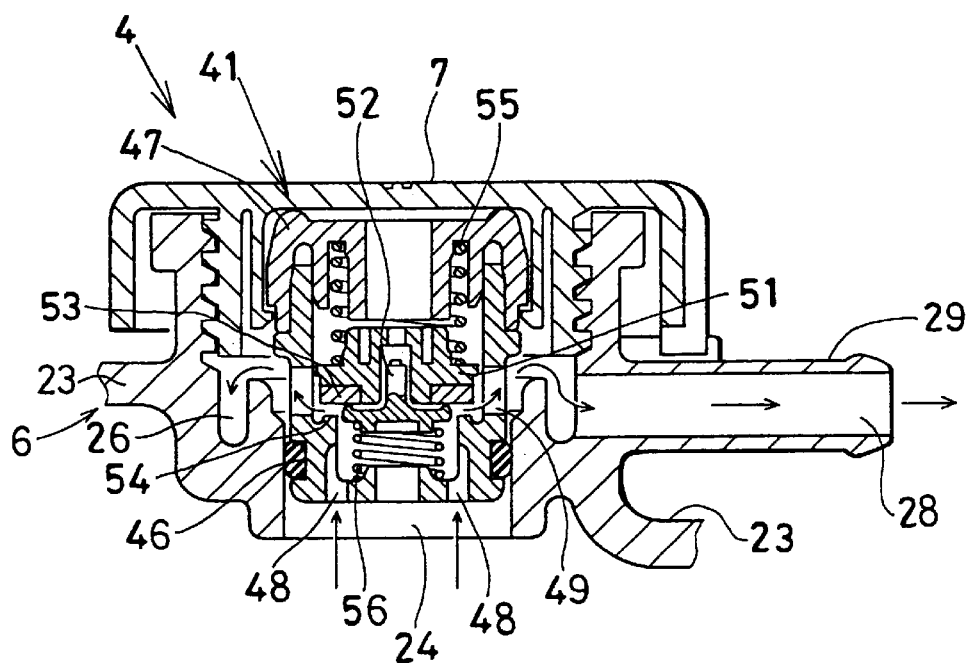
FIG. 5 is cross-sectional view showing an operating state of a valve for a sealed reserve tank according to the present invention.
Figure 6:
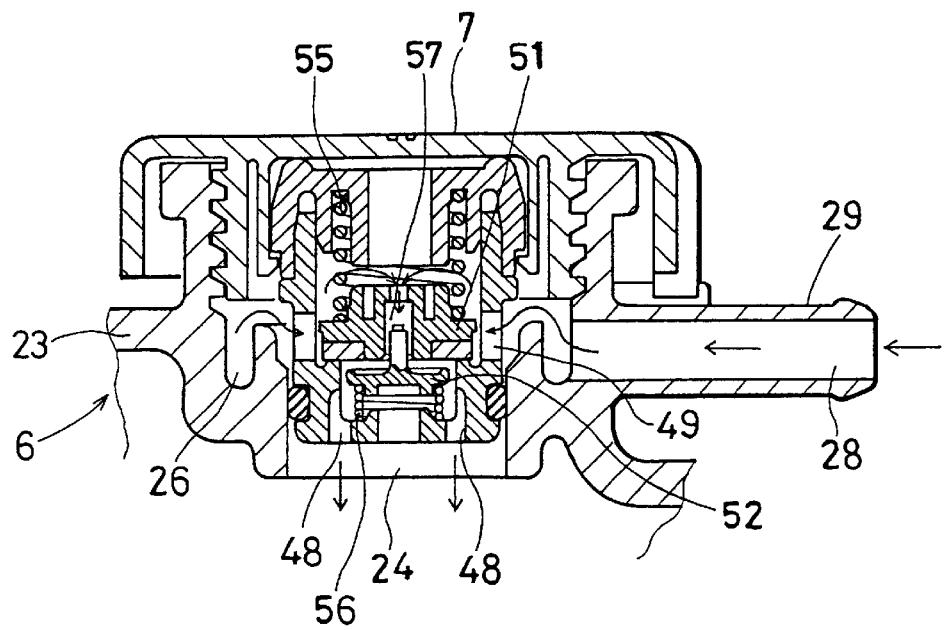
FIG. 6 is cross-sectional view showing a negative-pressure operating state of a valve for a sealed reserve tank according to the present invention.

Next, the structure of the sealed reserve tank 4 of the present embodiment is explained by referring to FIGS. 1 to 6. FIG. 4 is a diagram showing the main structure of the sealed reserve tank 4. FIG. 5 is a diagram showing an operating state of a valve under increased pressure. FIG. 6 is a diagram showing an operation of the valve under a negative pressure.

The sealed reserve tank 4 comprises a tank main body 6 made, preferably of polypropylene resin, and a pressure-type resin screw cap 7 made preferably of nylon resin. The resin screw cap 7 is screwed into a neck filler 20 formed on the upper end of the tank main body 6.

Tank main body 6 is the main body of the sealed container of the present invention. The tank main body 6 is a case body shaped as a container, spilt into an upper and lower portion. A bracket 8, shaped like an arm, extends from one side surface of the tank main body 6 toward the upper end of the mounting wall 15. A first pipe 21 having a cylindrical shape horizontally protrudes from the other side surface of the tank main body 6. The first pipe 21 communicates with, in a liquid-tight manner, the air bleeding circuit (a connection pipe) 12 which communicates with the upper tank 3a of the radiator 3.

Cylindrical pin 9 vertically protrudes from the bottom surface of tank body 6. A second pipe 22, cylindrically shaped, horizontally protrudes from the side surface of the tank main body 6, proximate cylindrical pin 9. The second pipe 22 is connected with, in a liquid-tight manner, the pressure applying circuit (a connection pipe) 11 which is connected to the inlet of the water pump 2.

A single resin assembly is formed in the neck filler (neck portion) 20 which is approximately cylindrical in shape and vertically protrudes from a middle area of the shoulder portion 23 of the tank main body 6. As shown in FIGS. 1 and 4, the single resin assembly comprises an inner wall 25 having a cylindrical shape, an outer wall 27 also having a cylindrical shape and an overflow pipe 29 also having a cylindrical shape. The inner cylindrical wall 25 forms an injection port 24 for injecting cooling water. The outer cylindrical wall 27 is provided on the outer circumference of the inner cylindrical wall 25, being separated from the circumference by an annular gap (or an annular path) 26 and having a predetermined width. The overflow pipe 29 has an internal overflow path 28 therein.

On the inner circumference of the inner cylindrical wall 25, a seal portion 30 sealing with a sealed gasket 46 of the resin screw cap 7 is provided. On the upper end of the inner cylindrical wall 25, an annular gap 31 with an inner diameter larger than the seal portion 30 is provided. In the figures, the upper end of the inner cylindrical wall 25 is the top of the inner cylindrical wall 25. It should be noted that the edge of the upper end of inner cylindrical wall 25 is about the same height as the position of the upper end of the internal overflow path 28.

On the inner circumference of the cylindrical outer wall 27, a mounting screw portion 32 (corresponding to a first screw portion of the present invention) is provided. The mounting screw portion 32 is a male screw portion for firmly tightening the resin screw cap 7. On the outer circumference of an end of the outer cylindrical wall 27, a wall thickness portion 33 having a cylindrical shape is formed. When cooling water is injected, a chuck engages wall thickness unit 33. Two protrusions 34 protrude from the outer circumferential surface of the outer cylindrical wall 27 and the upper-end surface of the overflow pipe 29 in the side and upward directions shown in the figure. The protrusions 34 stop resin screw cap 7 from turning.

The overflow pipe 29 protrudes horizontally from the sealed reserve tank 4 and is integrated with the tank body 6 in the centrifugal radial direction (or the side direction) of the outer cylindrical wall 27 of the tank main body 6. The internal overflow path 28 formed inside the overflow pipe 29 discharges cooling water flowing into a gap 26 (the annular path formed between the inner cylindrical wall 25 and the outer cylindrical wall 27 to the outside of the sealed reserve tank 4. The cooling water is cooling water overflowing from the resin screw cap 7.

As shown in FIGS. 1, 4, 5 and 6, the resin screw cap 7 includes components such as a pressure unit 41, an cylindrically shaped outer wall portion 42, a cylindrically shaped handle 44, a ceiling wall 45 and a sealed gasket 46. The pressure unit 41 forms an internal wall. The outer wall portion 42 is provided on the outer circumferential side of the pressure unit 41. The cylindrical handle 44 is separated away from the outer wall portion 42 by a gap 43 having a predetermined width. The ceiling wall 45 links the upper end of the outer wall portion 42 to the upper end of the cylindrical handle 44. In the figures, the upper ends are each a portion on the top. The sealed gasket 46 forms a seal with the inner circumferential surface (or the seal portion 30) of the inner cylindrical wall 25 of the tank main body 6.

The pressure unit 41 has a pressure valve (a relief valve or a pressure control valve) 51 and a negative pressure valve (or a vacuum valve) 52. The pressure valve 51 opens when the internal pressure of the tank main body 6 is equal to or higher than a predetermined value or a set value of typically 108 kPa. The negative pressure valve 52 opens when the tank internal pressure of the tank main body 6 becomes negative.

The pressure valve 51 includes a pressure valve body accommodated in a valve case 47 and serves as an internal wall portion. The pressure valve body is accommodated so that the body is displaced up and down with a high degree of freedom. The pressure valve body is lifted upward in the figure from an annular seat 54, resisting the energizing force of a coil spring 55 through a gasket 53. The gasket 53 is made typically of an elastic material, preferably rubber. In this configuration, as shown in FIG. 5, when the tank internal pressure of the cooling water system exceeds a limit during engine operation, pressure valve 51 opens and tank main body 6 communicates with the annular gap 26 through communicating holes 48 and 49. As a result, cooling water is discharged through the overflow pipe 29, controlling the tank internal pressure to a level equal to or below the set value.

The negative pressure valve 52 includes a pressure valve body accommodated in the valve case 47 positioned below the pressure valve 51. The pressure valve body is accommodated so that the body can be displaced up and down with a high degree of freedom. The pressure valve body is moved in the downward direction according to the figure from the lower surface of the gasket 53 shown in the figure, resisting the energizing force of a coil spring 56. In this configuration, as shown in FIG. 6, when the temperature inside the cooling water system decreases, causing the pressure in the tank to become lower than the atmospheric pressure while the engine is stopped, the negative pressure valve 52 opens, allowing the tank main body 6 to communicate with the annular gap 26 through communicating holes 48, 57 and 49. As a result, outside air is introduced, eliminating the negative pressure.

The communicating holes 48 and 49 are formed through the valve case 47, whereas the communicating hole 57 is formed in the middle of the pressure valve 51. The upper and lower portions of the valve case 47, according to the figure, are welded into a single body through a welding portion 58 by an ultrasonic welding technique.

On the outer circumference on the upper end of the valve case 47, a flanged portion 60 for fixing the valve case 47 inside the resin screw cap 7 is formed. The valve case 47 is fixed to the resin screw cap 7 by locking with an end nail portion of an elastically deformable locking piece 59 provided on the inner circumferential side of the outer wall portion 42. On the outer circumference on the lower end of the case valve 47, an O-ring groove 61 (an annular mounting groove) for holding a sealed gasket 46 is formed.

On the outer circumference of the outer wall portion 42, a mounting screw portion 62 (corresponding to a second screw portion of the present invention) is formed. The mounting screw portion 62 attaches to mounting screw portion 32 of the outer cylindrical wall 27 to assure firm attachment to the neck filler 20 of the tank main body 6. Outer wall 42 and mounting screw 62 are positioned such that the lower end of the engagement area of the screw portion 32 and the mounting screw 62 is positioned higher than the sealed gasket 46 by a difference in set position (H2–H1). At the end of the cylindrical handle 44 (or the lower end according to the figure), a locked portion 63 is formed. The locked portion 63 locks portions surrounding the resin screw cap 7 by the locking protrusions 34 of the tank main body 6.

The sealed gasket 46 corresponds to a seal portion of the present invention. The sealed gasket 46 is integrated with the outer circumference of the resin screw cap 7 by being held in an O-ring groove 61 of the valve case 47. The sealed gasket 46 is provided between the inner-circumferential surface (the seal portion 30) of the inner cylindrical wall 25 and the outer-circumferential surface (the O-ring groove 61) of the valve case 47 of the resin screw cap 7. Pressed by the inner cylindrical wall 25 and the valve case 47, the sealed gasket 46 serves as an O-ring seal member made of an elastic material such as rubber. The sealed gasket 46 thus functions as a seal between the inner cylindrical wall 25 of the tank main body 6 and the valve case 47 of the resin screw cap 7.

Next, a method of installing and removing the sealed reserve tank 4 of the first embodiment is explained by referring to FIG. 1. To replace cooling water used in the cooling water system with new water, it the used cooling water must be completely drained from the injection port 24 and new cooling water must be injected by removing the resin screw cap 7 from the sealed reserve tank 4. If this must be done right after the engine 1 is halted, the used cooling water has a high temperature and a high pressure.

To remove the resin screw cap 7 from the neck filler 20, the service person grabs the cylindrical handle 44 of the resin screw cap 7 and removes the locked portion 63 formed on the end (that is, the lower end according to the figure) of the handle 44 from the two protrusions 34. Then, by rotating the resin screw cap 7 to loosen it from the sealed reserve tank 4, the sealed gasket 46 is removed from the seal portion 30 of the inner cylindrical wall 25 as shown in FIG. 1. In this case, it is possible that the cooling water with the volume thereof increased in the tank main body 6 overflows the injection port 24 and the seal portion 30 of the tank main body 6.

Then, the cooling water overflowing the seal portion 30 of the tank main body 6 flows into the gap 26 (the annular path) formed between the outer cylindrical wall 27 and the inner cylindrical wall 25 of the tank main body 6 as shown in FIG. 1. Subsequently, the cooling water flowing through the annular gap 26 is discharged to the outside from the lower end of the outer cylindrical wall 27 according to the figure by way of the internal overflow path 28. As a result, air bleeding occurs and a residual pressure in the cooling-water system is eliminated.

The position H1 is a position of the sealed gasket 46 slipping off from the seal portion 30. The sealed gasket 46 is held inside the O-ring groove 61. The position H2 is the position of the lower ends of the mounting screw portion 62 and the outer wall portion 42 of the resin screw cap 7. The position H1 is set at a position lower than the position H2. In such a configuration, even if a large amount of cooling water overflows, the cooling water will never leaks out to portions surrounding the neck filler 20 and portions surrounding the handle 44 through a gap formed between the mounting screw portion 32 and the mounting screw portion 62.

As described above, when the resin screw cap 7 is removed from the neck filler 20 while the cooling water is at high temperature and high pressure, the sealed reserve tank 4 prevents the surface of the tank main body 6, including shoulder portion 23, from getting dirty without jeopardizing the safety of the service person due to high-temperature cooling water dispersing over portions surrounding the handle 44 of the resin screw cap 7.

Thus, when the resin screw cap 7 is removed from the tank main body 6, no cooling water is dispersed over portions surrounding the resin screw cap 7, including the upper surface of shoulder portion 23 of the tank main body 6. As s result, since no high temperature cooling water is splashed toward the service person, safety is improved. In addition, since no cooling water is dispersed over portions surrounding the resin screw cap 7, the surface of the tank main body 6 such as the shoulder portion 23 stays clean, keeping the appearance nice.

Figure 7:
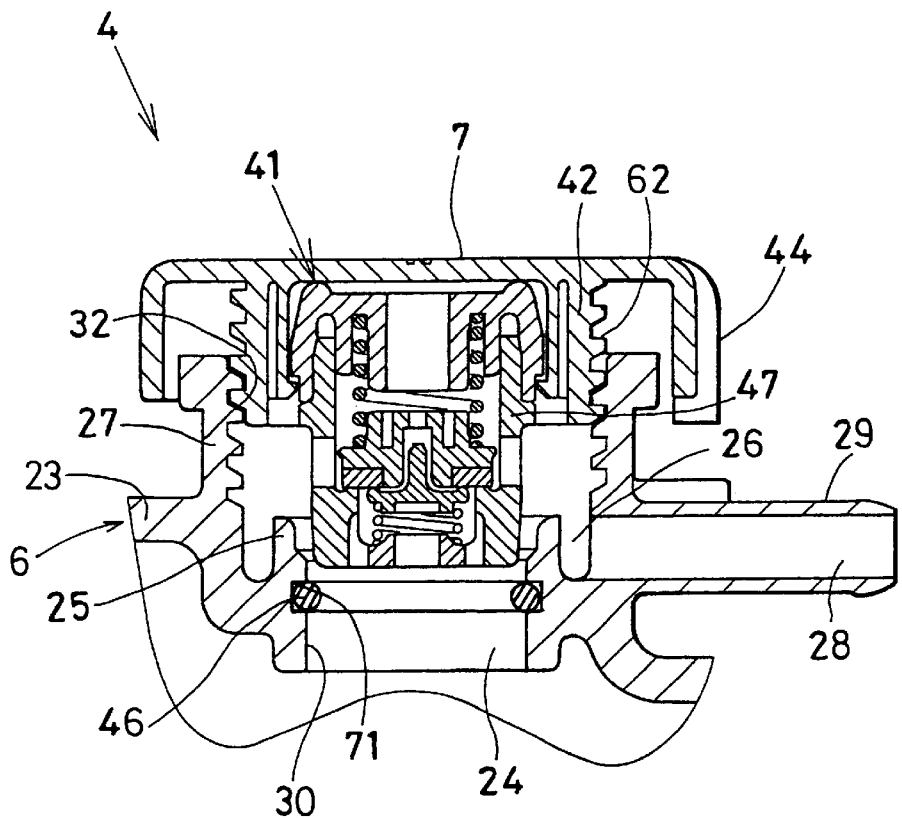
FIG. 7 is a cross-sectional view showing a residual pressure elimination structure for a sealed reserve tank according to the present invention.

FIG. 7 is a diagram showing a second embodiment of the present invention. The figure shows a condition where a seal material is displaced when a resin screw cap 7 is removed from the main body 6. Here, an O-ring groove (or an annular mounting groove) is formed for mounting an O-ring sealed gasket 46 on the inner circumferential surface (a seal portion 30) of an inner cylindrical wall 25 of a tank body 6. Thus, when the resin screw cap 7 is loosened in order to remove the resin screw cap 7 from the tank main body 6, the sealed gasket 46 comes off valve case 47 of the resin screw cap 7, causing cooling water to overflow the upper end of the inner cylindrical wall 25.

Subsequently, the cooling water overflowing the upper end of the inner cylindrical wall 25 of the tank main body 6 is discharged to the outside through annular gap (a annular path) 26 formed between an outer cylindrical wall 27 and the inner cylindrical wall 25 of the tank main body 6 and through overflow path 28 as shown in FIG. 7. As a result, air bleeding occurs and a residual pressure in the cooling-water system is eliminated.

Figure 8:
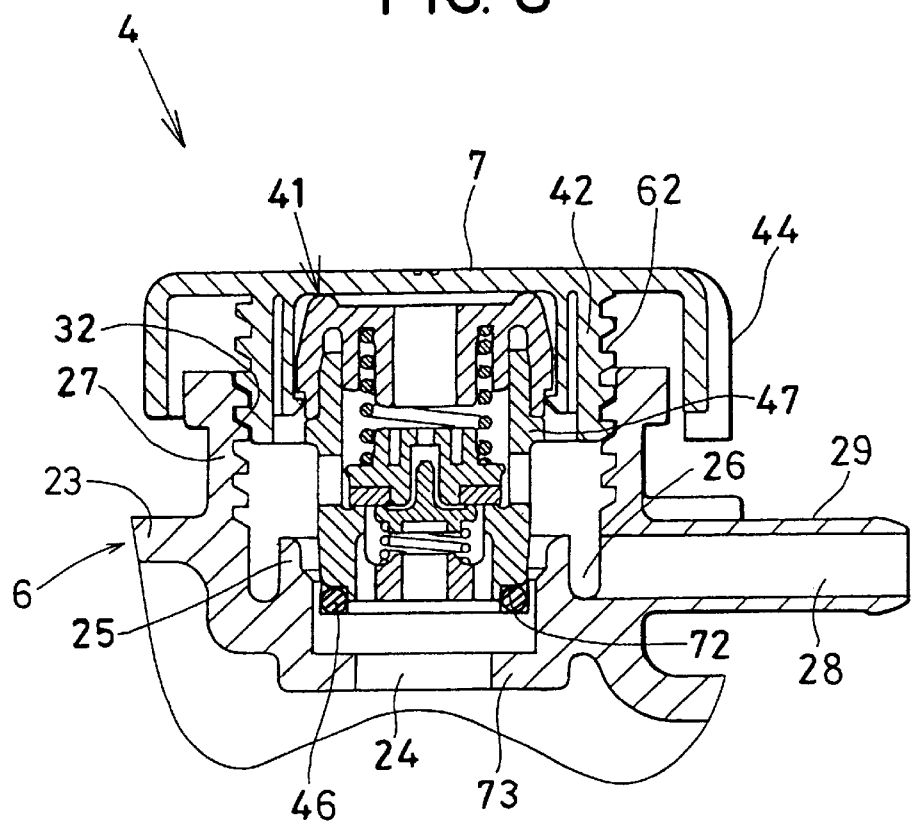
FIG. 8 is a cross-sectional view showing a residual pressure elimination structure for a sealed reserve tank according to the present invention.

FIG. 8 is a diagram showing a third embodiment of the present invention. The figure shows the seal material being displaced when a resin screw cap 7 is removed from the main body 6. In this embodiment, a planer portion 72 is formed for mounting a O-ring sealed gasket 46 on the lower end of a valve case 47 of the resin screw cap 7. Thus, when the resin screw cap 7 is loosened for removal, the sealed gasket 46 comes off the upper surface of flanged portion 73 of an inner cylindrical wall 25. This causes cooling water to overflow at the upper end of the inner cylindrical wall 25. Subsequently, overflowing cooling water is discharged to the outside through an annular gap (an annular path) 26 and overflow path 28. As a result, air bleeding occurs and residual pressure in the cooling-water system is eliminated.

Figure 9:
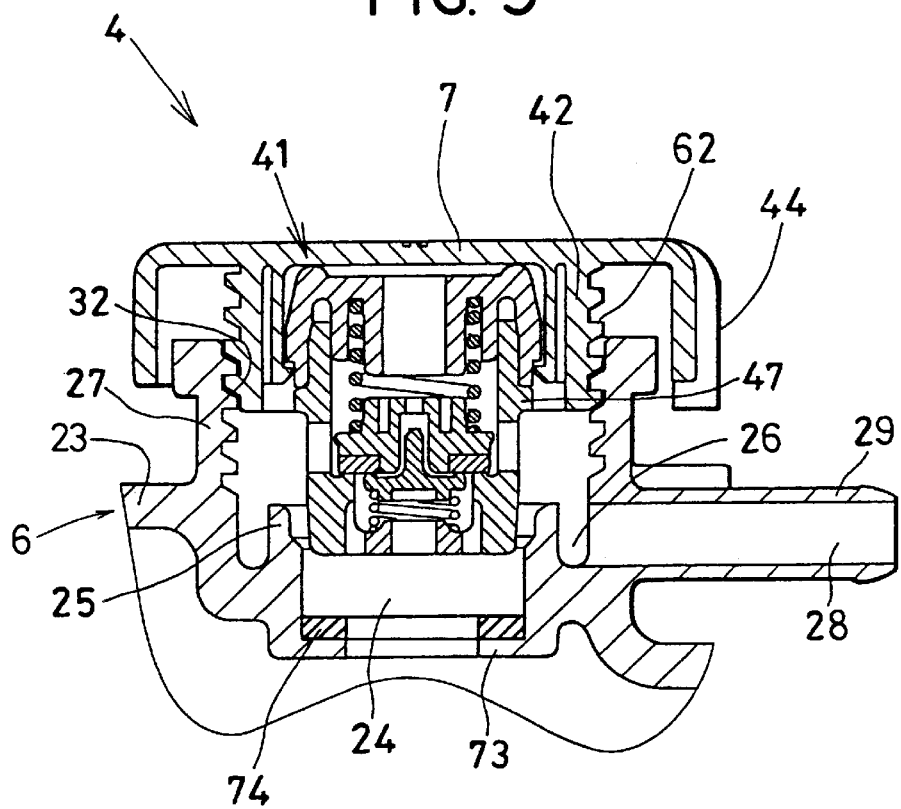
FIG. 9 is a cross-sectional view showing a residual pressure elimination structure for a sealed reserve tank according to the present invention.

FIG. 9 is a diagram showing a fourth embodiment of the present invention. The figure shows the seal material being displaced when a resin screw cap 7 is removed from the main body 6. Here, an annular sealed gasket 74 is mounted on the upper surface of an annular flanged portion 73 which protrudes inwardly from the inner circumference of an inner cylindrical wall 25 of the tank body 6. The sealed gasket 74 corresponds to a seal portion and a seal material provided by the present invention. Thus, when the resin screw cap 7 is loosened for removal, the sealed gasket 74 comes off the lower-end surface of a valve case 47, causing cooling water to overflow at the upper end of the inner cylindrical wall 25 after flowing through a gap between the inner cylindrical wall 25 and the valve case 47.

Subsequently, the cooling water overflowing the upper end of the inner cylindrical wall 25 is discharged outside through an annular gap (an annular path) 26 formed between an outer cylindrical wall 27 and the inner cylindrical wall 25 and by way of an overflow path 28 as shown in FIG. 9. As a result, air bleeding occurs and residual pressure in the cooling-water system is eliminated.

Figure 10:
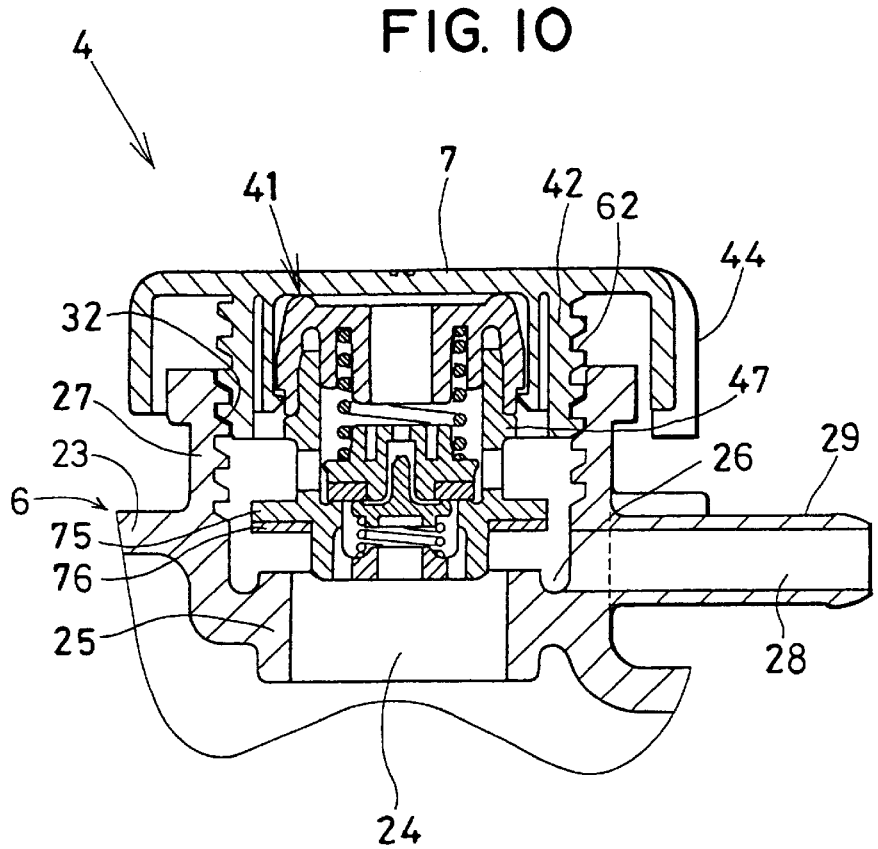
FIG. 10 is a cross-sectional diagram showing a residual pressure elimination structure for a sealed reserve tank according to the present invention.

FIG. 10 is a diagram showing a fifth embodiment of the present invention. The figure shows the seal material being displaced when a resin screw cap 7 is removed from the main body 6. Here, an annular sealed gasket 76 is mounted on the lower surface of an annular flanged portion 75 outwardly protruding from the outer circumference of a valve gasket 47 of the resin screw cap 7. The sealed gasket 76 corresponds to a seal portion and a seal material provided by the present invention. Thus, when the resin screw cap 7 is loosened, the sealed gasket 76 comes off the upper-end surface of inner cylindrical wall 25, causing cooling water to overflow at the upper end of the inner cylindrical wall 25. Subsequently, overflowing cooling water is discharged outside through an annular gap (an annular path) 26 and an overflow path 28 as shown in FIG. 10. As a result, air bleeding occurs and a residual pressure in the cooling-water system is eliminated.

Figure 11:
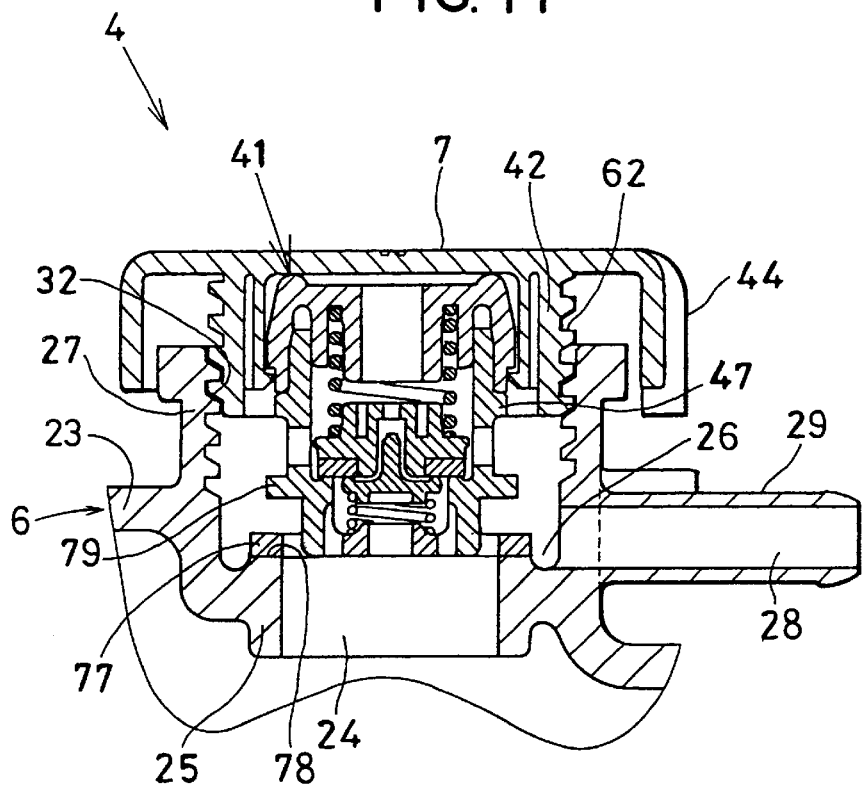
FIG. 11 is a cross-sectional diagram showing a residual pressure elimination structure for a sealed reserve tank according to the present invention.
Figure 12:
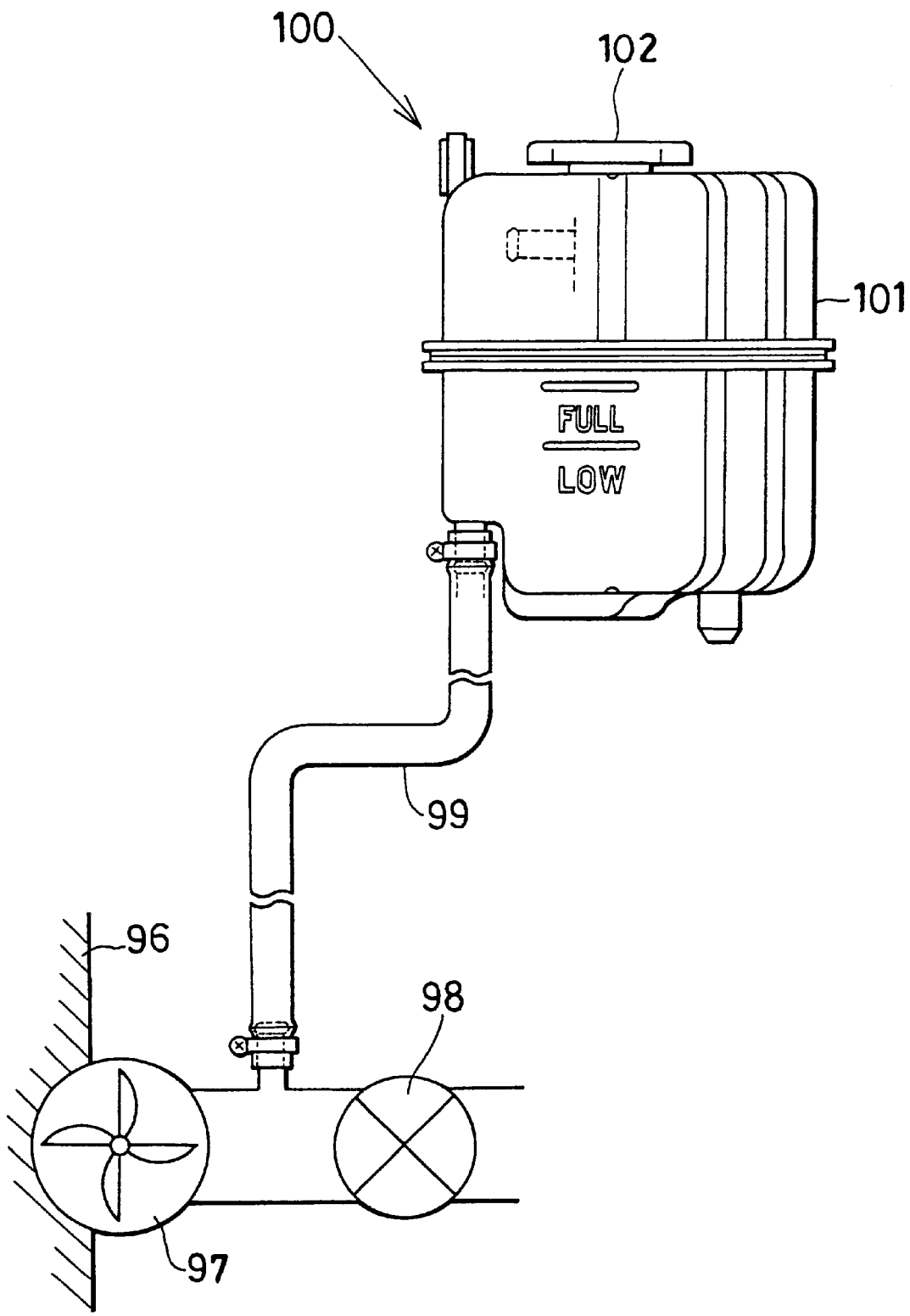
FIG. 12 is a cross-sectional diagram showing an installation structure of a conventional sealed reserve tank according to the prior art.
Figure 13:
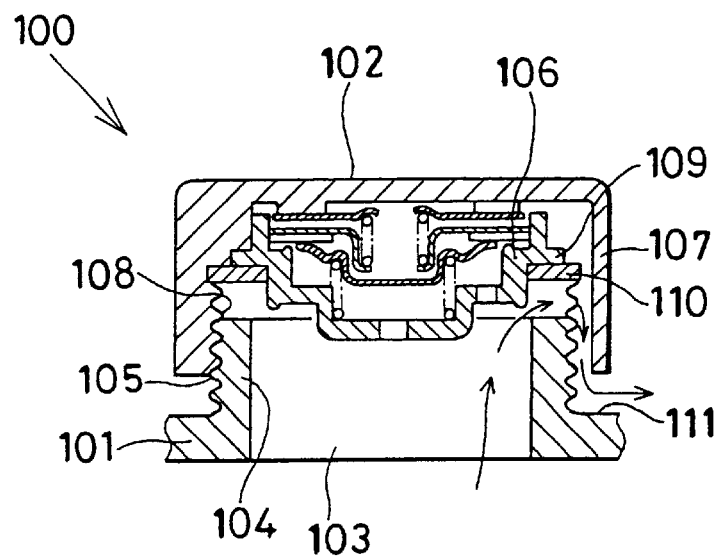
FIG. 13 is a cross-sectional diagram showing a residual pressure elimination structure of a first conventional sealed reserve tank according to the prior art.
Figure 14:
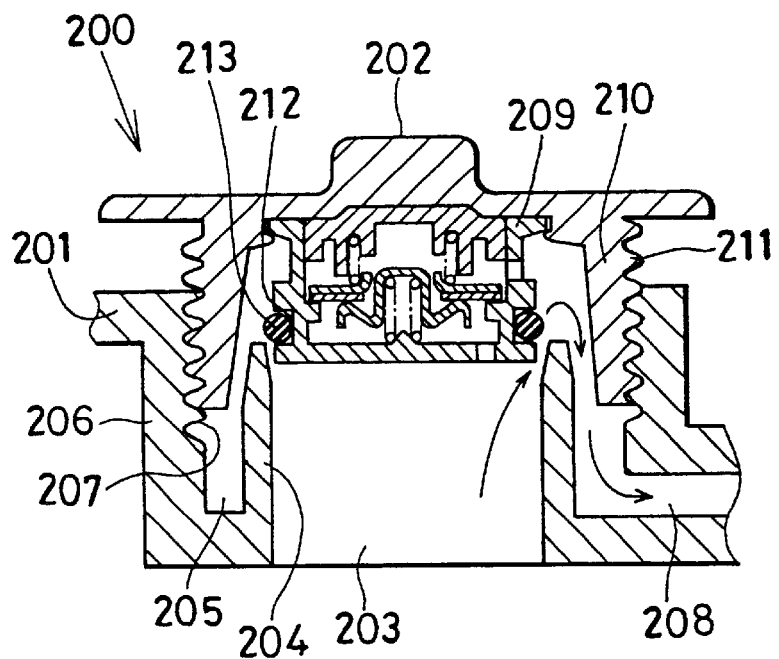
FIG. 14 is a cross-sectional diagram showing a residual pressure elimination structure of a second conventional sealed reserve tank according to the prior art.

FIG. 11 is a diagram showing a sixth embodiment of the present invention. The figure shows the seal material being displaced when a resin screw cap 7 is removed from the main body 6. Here, a planer portion 78 is provided for mounting an annular sealed gasket 77 inwardly on the upper-end surface of an inner cylindrical wall 25 of the tank body 6. The sealed gasket 77 corresponds to a seal portion and a seal material provided by the present invention. Thus, when the resin screw cap 7 is loosened, the sealed gasket 77 comes off the lower-end surface of a flanged portion 79 protruding toward the outer circumference of a valve case 47 of the resin screw cap 7. This causes cooling water to overflow the sealed gasket 77 mounted on the portion 78 after flowing through a gap between the inner cylindrical wall 25 and the valve case 47.

Subsequently, the cooling water overflowing the sealed gasket 77 is discharged to the outside through an annular gap (an annular path) 26 formed between an outer cylindrical wall 27 and the inner cylindrical wall 25 and through an overflow path 28. As a result, air bleeding occurs and residual pressure in the cooling-water system is eliminated.

In the embodiments described above, the present invention is applied to a resin screw cap 7 of a sealed reserve tank 4. Note, however, that the present invention can also be applied to a metal screw cap of a sealed reserve tank. In addition, the present invention can also be applied to a pressure cover body or a pressure cap of a radiator. It is also worth noting that another fluid that increases pressure when heated can also be used in addition to cooling water. Examples of the other fluid are air and oil.

In the embodiments described above, as an annular seal portion, an O-ring sealed gasket 46 is made of an elastic material such as rubber. It should be noted, however, that as the annular seal portion, an annular sealed gasket made of resin or a metal can be mounted as shown in FIGS. 9 to 11. In addition, an annular seal portion can be provided on the outer circumference of the inner wall portion (valve case) 47 of the resin screw cap 7 as an integrated portion of the resin screw cap 7 as shown in FIG. 7.

Note that it is desirable to direct the exit of the overflow pipe 29 where the service person is not present. In addition, a rubber hose can be attached to the overflow pipe 29 so that overflowing cooling water is not dispersed over the surface of the sealed reserve tank 4.

While the above-described embodiments refer to examples of usage of the present invention, it is understood that the present invention may be applied to other usage, modifications and variations of the same, and is not limited to the disclosure provided herein.

What is claimed is:

1. A sealed container comprising:

a main body of a container for accommodating an internal fluid;

a removable cap for sealing an injection port of a passage for injecting a fluid into the main body of the container;

an annular seal portion providing a seal between the main body of the container and the cap;

a protrusion that protrudes from an outer circumferential surface of an outer cylindrical wall of the main body;

a locked portion that locks portions surrounding the cap by engaging the protrusions of the main body;

a first spring acting within a positive pressure control valve attached to the cap; and a second spring acting within a negative pressure control valve attached to the cap;

wherein the first and the second springs are coaxially aligned;

wherein the main body of the container has an inner cylindrical wall forming the injection port, the outer cylindrical wall provided on an outer side of the inner cylindrical wall and a first screw portion formed on an inner side or an outer side of the outer cylindrical wall;

wherein the cap has an inner wall portion inserted inside of the inner cylindrical wall, an outer wall portion provided on the outer side of the inner wall portion and screwed on the outer cylindrical wall and a second screw portion formed on an outer circumference or an inner circumference of the outer wall portion and screwed with the first screw portion;

wherein on the outer cylindrical wall of the main body of the container, an overflow path is provided for discharging a fluid leaking from a position beneath the first screw portion through a gap between the seal portion and the inner cylindrical wall to the outside of the sealed container; and wherein the seal portion is mounted between the inner cylindrical wall and the inner wall portion, when the cap is removed from the main body of the container, the seal portion is positioned below a position where the first screw portion is screwed with the second screw portion.

2. A sealed container according to claim 1, wherein the positive pressure control valve which opens when an internal pressure of the main body of the container exceeds a set value and the negative pressure valve which opens when the internal pressure of the main body of the container becomes negative are provided on the inner wall portion of the cap as a single body;

the inner wall portion of the cap has a valve case for holding the pressure control valve and the negative pressure valve so that the pressure control valve and the negative pressure valve can be displaced with a high degree of freedom; and a locking portion for locking the valve case is provided on the inner circumference of the outer wall portion of the cap.

3. A sealed container according to claim 1 wherein the seal portion is made of:

a seal component sandwiched between and slidably interfacing an inner circumferential surface of the inner cylindrical wall and an outer circumferential surface of the inner wall portion as the cap is placed onto and removed from the main body.

4. A sealed container according to claim 3 wherein an annular mounting groove for mounting the seal portion is provided on the outer circumference of the inner wall portion of the cap.

5. A sealed container according to claim 3 wherein an annular mounting groove for mounting the seal portion is provided on the inner circumference of the inner cylindrical wall of the main body of the container in order to create a seal only below the overflow pipe between the inner circumference of the inner cylindrical wall of the main body of the container and the inner wall portion of the cap and to facilitate proper fluid discharge at a particular instance during removal of the cap when the container is experiencing a positive pressure.

6. A sealed container according to claim 3 wherein a planar portion for mounting the seal portion is provided on the lower end of the inner wall portion of the cap.

7. A sealed container according to claim 3 wherein a flanged portion for mounting the seal portion is provided on the inner circumference of the inner cylindrical wall of the main body of the container in order to create a seal only below the overflow pipe between the inner circumference of the inner cylindrical wall of the main body of the container and the inner wall portion of the cap and to facilitate proper fluid discharge at a particular instance during removal of the cap when the container is experiencing a positive pressure.

8. A sealed container according to claim 3 wherein a flanged portion for mounting the seal portion is provided on the outer circumference of the inner wall portion of the cap.

9. A sealed fluid system comprising:

a container for accommodating an internal fluid;

a removable cap for sealing an overflow path within an overflow pipe leading from an interior of the container to an exterior of the container, the removable cap further comprising;

a top handle portion which interfaces with the container to secure the cap to the container;

a protrusion that protrudes from an outer circumferential surface of an outer cylindrical wall of the container;

a locked portion that locks portions surrounding the cap by the protrusion of the container;

a positive pressure valve and a negative pressure valve, contained by a valve case having a flanged peripheral portion that locks into an elastic locking portion of the cap, the positive pressure valve and the negative pressure valve being vertically and coaxially aligned and respectively symmetrical about a vertical axis;

a first end of a positive pressure valve spring acting against a top interior portion of the valve case and a second end of the positive pressure valve spring acting against the positive pressure valve;

a first end of a negative pressure valve spring acting against a bottom interior portion of the valve case and a second end of the negative pressure valve spring acting against the negative pressure valve; and an annular gasket sandwiched between the positive pressure valve and the negative pressure valve and held in place by the opposing forces of the positive pressure valve spring and the negative pressure valve spring;

wherein the valve case has communicating holes in a direction axial to the valve springs and in a direction perpendicular to the valve springs to permit fluid communication between the overflow pipe and the container;

wherein there is a single sealed gasket between the valve case and the container for permitting fluid flow to the overflow pipe when the cap is removed during a positive pressure situation.

10. The cap of claim 9, wherein the cap outer wall portion is located outside of the elastic locking portion and has a threaded exterior to match the interior threads of the main body outer wall to thereby create a fluid-tight partition between the valve case and a cap exterior under a non-pressurized container situation.

11. The cap of claim 10, wherein the outer wall portion of the cap accepts an internal pressure of the container to force the outer wall portion of the cap against the outer wall of the container top thereby further securing the threaded connection between the outer wall portion of the cap and the outer wall of the container.

12. The sealed fluid system of claim 9 further comprising:

a main body attached to a container top, the main body having a main body outer wall and a main body inner wall which meet to form an annular gap, the annular gap providing a fluid passageway for fluid communication between the valve case and the overflow pipe, the main body outer wall having threads on an inside peripheral portion, the annular passageway being located below.

13. The cap of claim 12, wherein a sealed gasket is located on a lower portion of the valve case and is sandwiched entirely between the valve case and the inner cylindrical wall of an injection port of the main body.

14. The cap of claim 13, wherein the sealed gasket permits fluid communication between the injection port and the annular passageway while the cap is sealedly connected to the outer wall of the main body, thereby relieving any excess pressure during cap removal while guiding all escaping fluids to the overflow pipe.

* * * * *